US006883754B2

(12) United States Patent
Ehrick

(10) Patent No.: US 6,883,754 B2
(45) Date of Patent: Apr. 26, 2005

(54) REMEDIATION OF FAN SOURCE PRODUCTION OF SMOKE IN AN AIRCRAFT CABIN

(75) Inventor: Stephen D. Ehrick, Yorba Linda, CA (US)

(73) Assignee: Inflight Warning Systems, LLC, Yorba Linda, CA (US)

( * ) Notice: Subject to any disclaimer, the term of this patent is extended or adjusted under 35 U.S.C. 154(b) by 1 day.

(21) Appl. No.: 10/222,494

(22) Filed: Aug. 15, 2002

(65) Prior Publication Data

US 2003/0042362 A1 Mar. 6, 2003

Related U.S. Application Data

(60) Provisional application No. 60/316,113, filed on Aug. 29, 2001.

(51) Int. Cl.[7] .............................................. B64D 11/00
(52) U.S. Cl. .................................................. 244/118.5
(58) Field of Search ........................... 244/118.5, 53 R, 244/62; 73/660; 702/56

(56) References Cited

U.S. PATENT DOCUMENTS 3,021,669 A * 2/1962 Nye
3,540,682 A * 11/1970 Dibble
3,647,196 A * 3/1972 Cotton
3,709,030 A * 1/1973 Aselman
3,825,212 A    7/1974 Darges et al.
4,261,416 A * 4/1981 Hamamoto
4,282,870 A    8/1981 Porlier
4,422,333 A * 12/1983 Leon
4,441,314 A    4/1984 Fitton
4,751,848 A * 6/1988 Miyamoto
5,934,610 A * 8/1999 Karolys et al.
6,053,047 A * 4/2000 Dister et al.
6,216,981 B1 * 4/2001 Helm
6,377,876 B1 * 4/2002 Hedeen et al.

* cited by examiner

Primary Examiner—Tien Dinh
(74) Attorney, Agent, or Firm—William W. Haefliger

(57) ABSTRACT

The method of remediating fan source production of smoke in an aircraft cabin, that includes detecting excessive vibration of the fan housing or frame produced in conjunction with fan rotor interference with the frame or housing causing smoke production, and effecting shut-down of fan rotor rotation in response to such detecting.

10 Claims, 6 Drawing Sheets

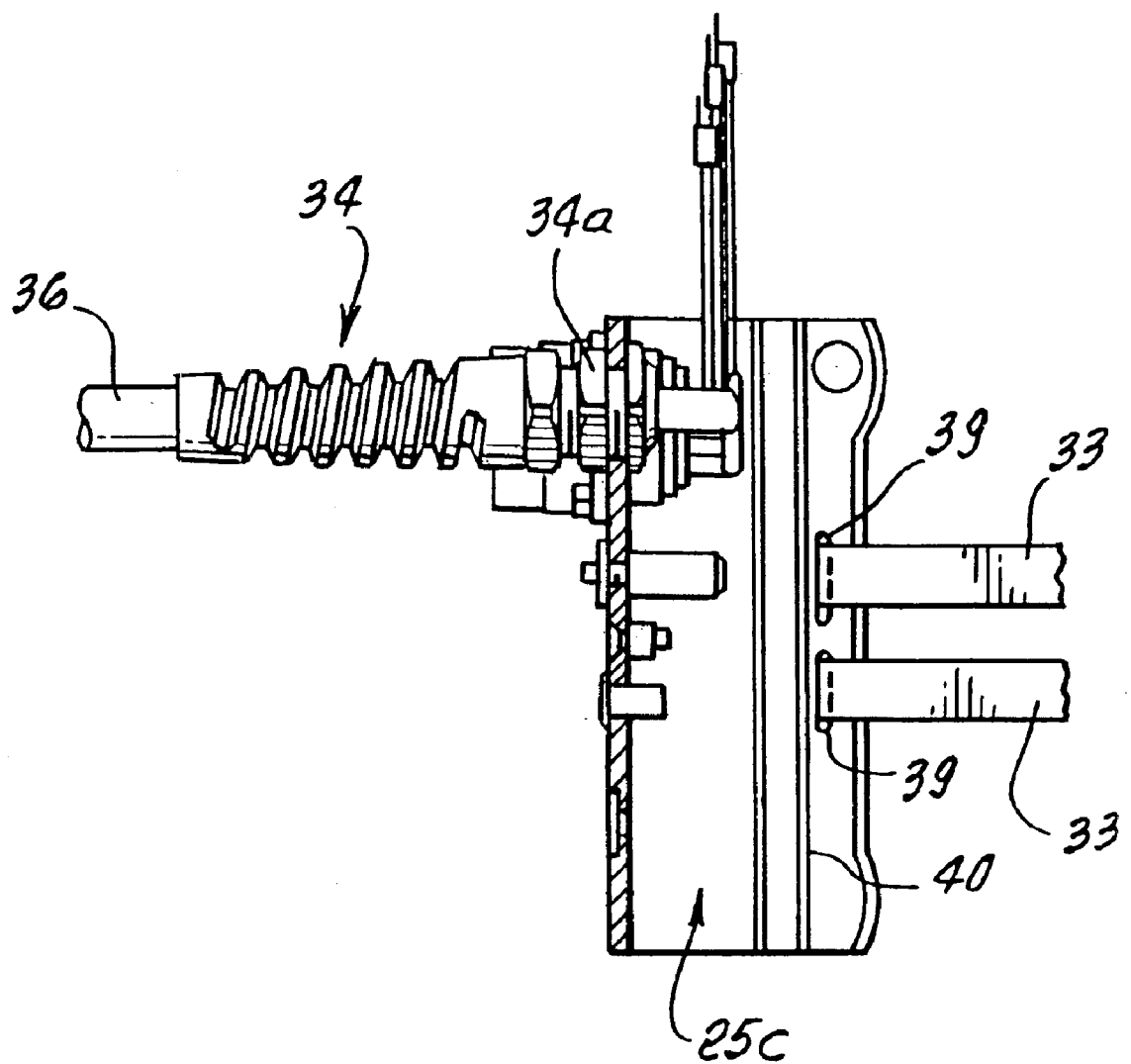

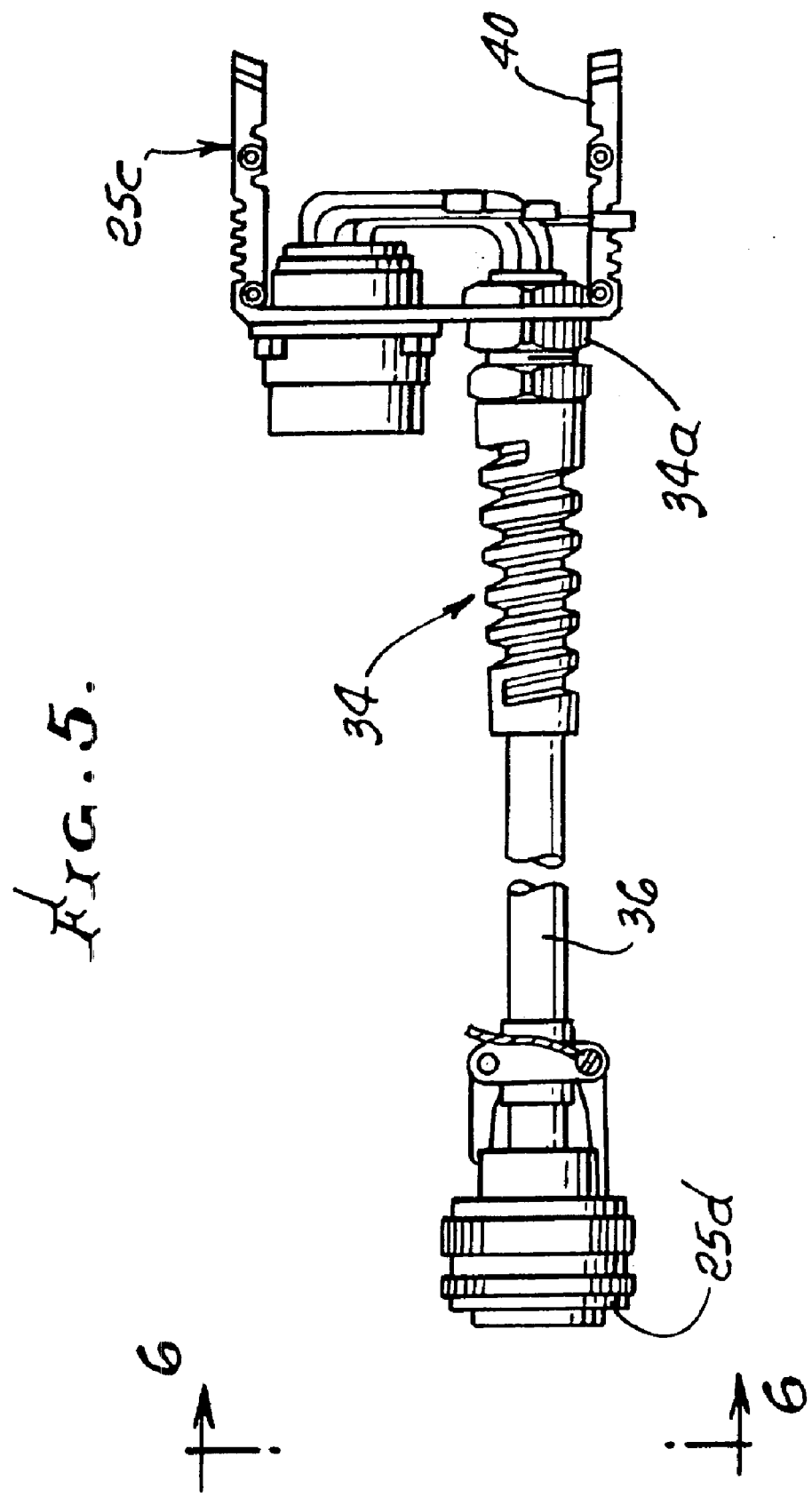

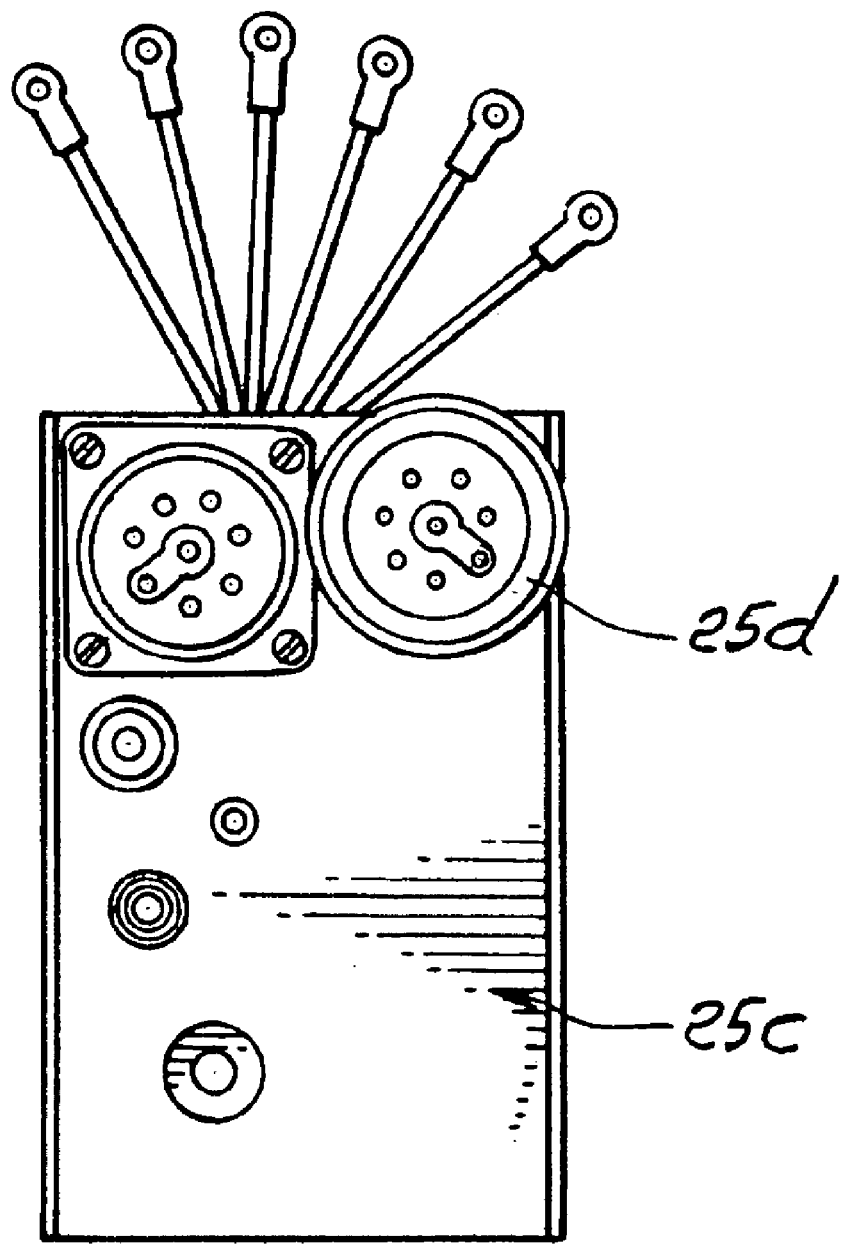

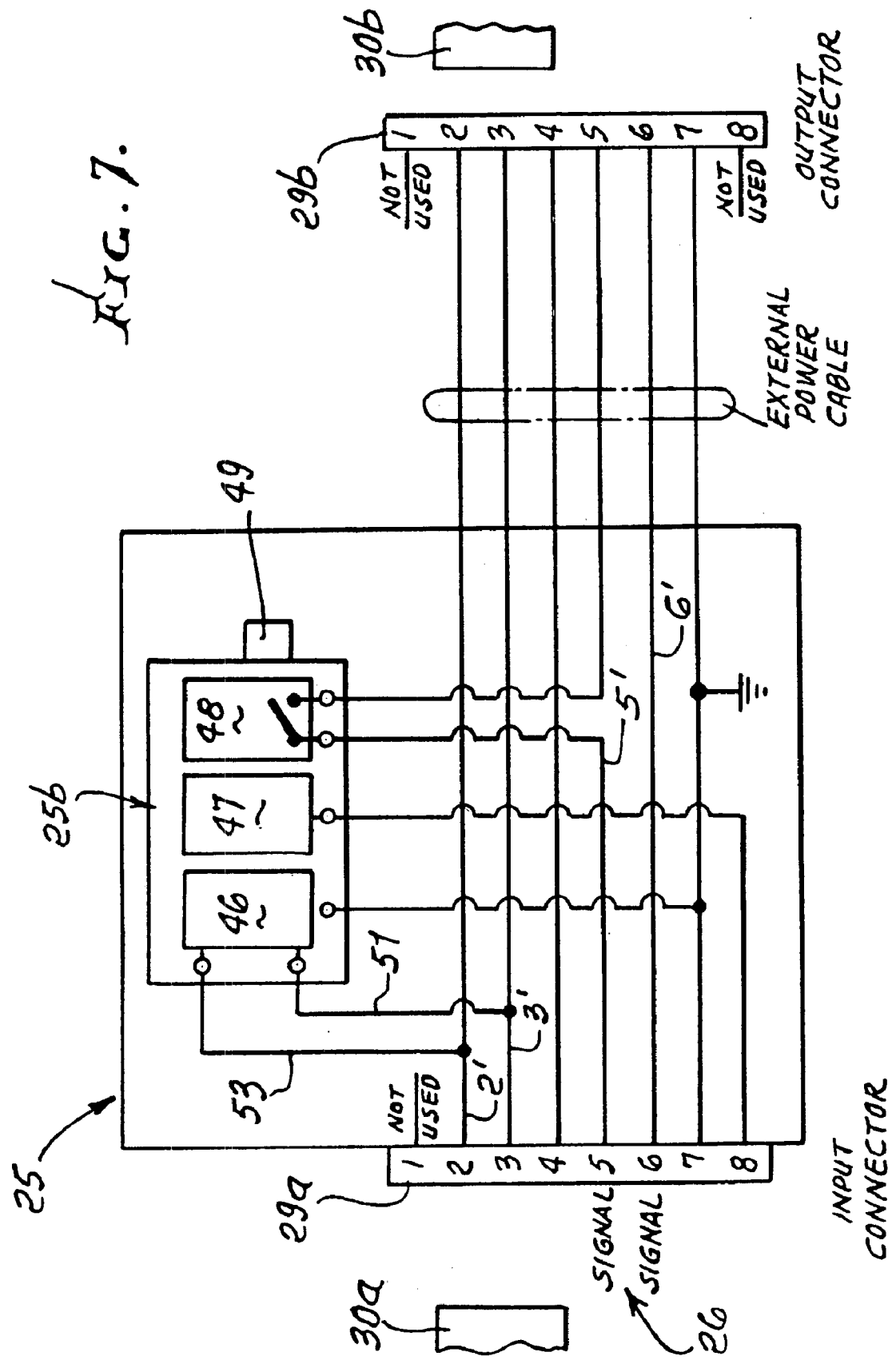

REMEDIATION OF FAN SOURCE PRODUCTION OF SMOKE IN AN AIRCRAFT CABIN

This application claims priority from provisional application Ser. No. 60/316,113, filed Aug. 29, 2001.

BACKGROUND OF THE INVENTION

This invention relates generally to inflight fan failures, in aircraft, and more particularly to remediation of problems such as smoke creation in aircraft, due to fan failures.

Aircraft groundings resulting from inflight fan failures are a serious concern for airlines and other operators. Smoke creation and flow to aircraft cabins, due to fan failures, leads to such groundings.

Aircraft equipped with cabin air fans, experience failures resulting in the production of smoke and odor in the passenger compartment. The existing thermal protection system as used conventionally in aircraft does not respond to a smoke condition when it results from fan bearing failures and consequent fan impeller contact with the fan housing. A need exists for a solution to this problem that has the following characteristics:

a) detects bearing failure prior to impeller, housing contact
b) removes power to fan and is re-settable by maintenance personnel only
c) capable of being installed on existing fans
d) retrofitable without removing fans from aircraft
e) provides a failure indication to the cockpit crew
f) and may, if desired, contain or employ a built-in test system.

SUMMARY OF THE INVENTION

It is a major object of the invention to provide a highly advantageous solution to the problem of air supply fan failure, due to impeller bearing failures, as for example on aircraft or other vehicles having cabins or passenger compartments, to which air is delivered. Basically, and in its method aspects, the invention includes the following:

a) detecting excessive vibration of the fan housing or frame produced prior to or in conjunction with fan rotor interference with the frame or housing causing smoke production,
b) and effecting shut-down of fan rotor rotation in response to such detecting.

Another object is to provide a vibration detector apparatus, positioning and operating said detector apparatus to provide such detecting, thereby producing a signal, effecting said shut-down. The vibration threshold to be detected is typically set to be below that at which fan rotor bearing deterioration results in fan blade tip interference such as engagement with the housing bore, during high speed impeller rotation. Such interference typically leads to melting of plastic material associated with the housing or frame and consequent formation of smoke.

Yet another object is to provide a method wherein the vibration level to be detected by the detector apparatus is predetermined so as to effect fan shut-down prior to significant smoke formation resulting from rotor blade tip engagement with the housing or frame, leading to melting of plastic material associated with the housing or frame.

A further object is to provide a method as described, for remediating of smoke formation in a vehicle cabin or passenger compartment, due to ventilation fan operation.

An additional object is to provide equipment for remediating fan source production of smoke in an aircraft cabin, comprising in combination:

a) first means for detecting excessive vibration of the fan housing or frame produced prior to or in conjunction with fan rotor interference with the frame or housing causing smoke production,
b) and second means for effecting shut-down of fan rotor rotation in response to such detecting.

Such first means may include vibration detector apparatus positioned and operating to provide such detecting, thereby producing a signal effecting said shut-down.

An added object is to provide for support of a vibration monitor on a fan housing, and electrical connection to the power connection to the fan motor, so as not to disable such power supply.

These and other objects and advantages of the invention, as well as the details of an illustrative embodiment, will be more fully understood from the following specification and drawings, in which:

DRAWING DESCRIPTION

FIG. 4 is a side elevation view of one type useable vibration monitor housing assembly;

FIG. 5 is a top plan view of the FIG. 4 housing aircraft; and

FIG. 6 is a front elevation view taken on lines 6—6 of FIG. 5.

FIG. 7 is a circuit schematic.

DETAILED DESCRIPTION

Figure 1:
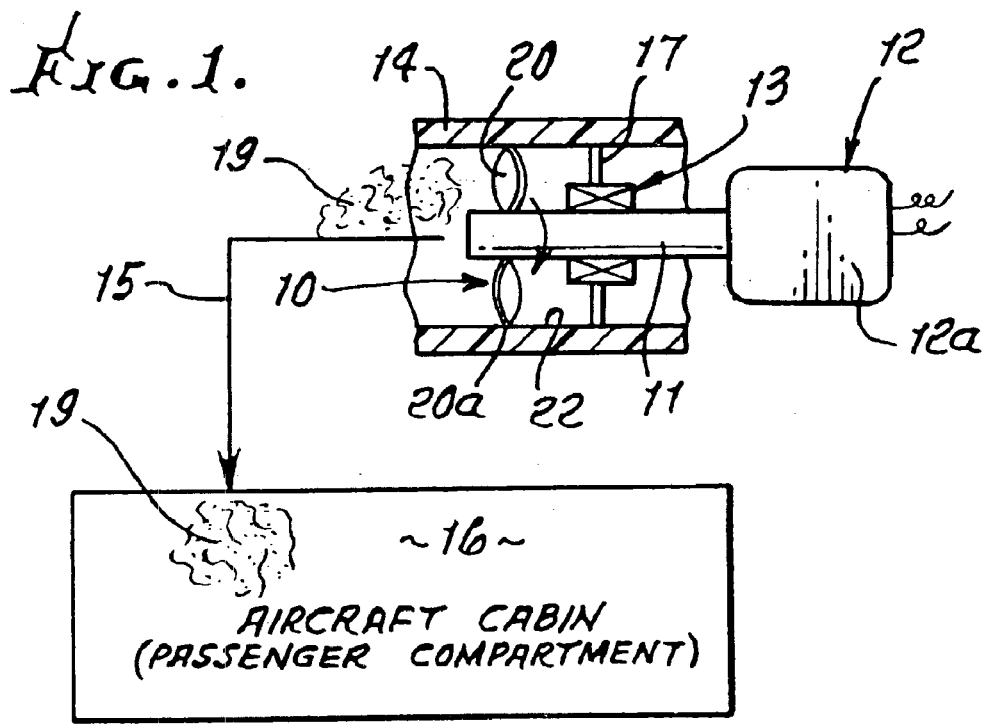
FIG. 1 is a schematic view of an air delivery system for use on aircraft.

In FIG. 1, a fan 10 is mounted on a shaft 11 rotated by a motor 12. A bearing or bearings 13 center the shaft within a housing 14 forming a duct for fan driven air flow as at 15 to a vehicle passenger compartment, such as an aircraft cabin 16, providing ventilation. The bearing or bearings are carried as by suitable structure 17. That structure shown as within 14, but it can also be located within or in association with the motor. The bearings can also be located within or in association with the motor. It is found that bearing wear, over time, can result in rotating shaft sideward deflection, causing corresponding sideward deflection of a fan 10. The tips 20a of rotating rotor blades 20 then can frictionally interfere with a bore 22 in the housing. Aircraft induced vibration of duct 14 relative to shaft 11 can also produce such interference. This can result in smoke formation, as for example due to friction and heat production at a plastic bore in the housing. Melt down of plastic material due to such heat production is found to occur. Such smoke is carried at 15 to the interior of the cabin 16, in the fan produced air flow; and in the past, aircraft have been grounded due to such smoke delivery to the aircraft cabin.

Figure 2:
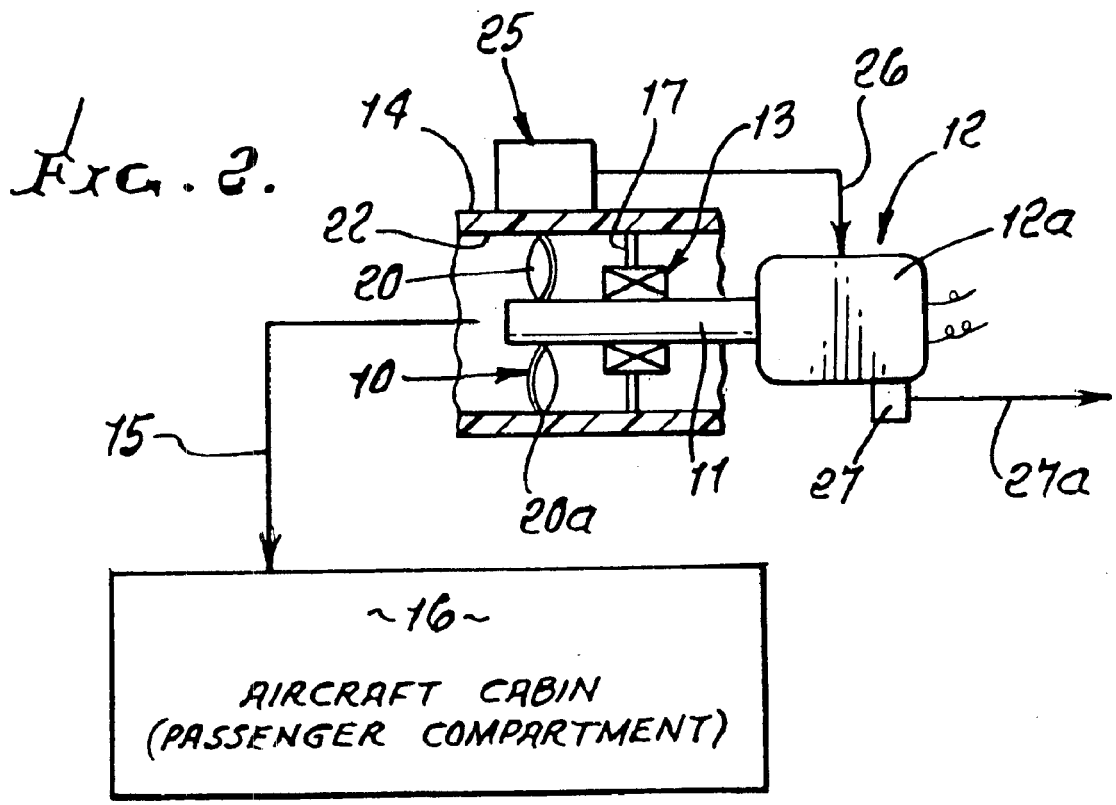
FIG. 2 is a schematic view of an air delivery system for use on aircraft, and in which the invention is employed.

In accordance with the invention, and referring to FIG. 2, vibration of the fan housing or duct 14 produced as in conjunction with bearing wear and fan rotor tip interference with the frame or housing is detected. Such vibration produced by vibration at the bearings is transmitted to the housing via bearing mounting structure 17, for example as when the bearings are located within that housing 14 or within the motor casing 12a. A vibration detector apparatus 25 is provided, and positioned and operated to detect excessive vibration of the housing or frame 14, produced as described, and which could lead to smoke production as described. Shut-down of fan rotor rotation is then effected in response to such detecting. An alternative is a reduction in fan RPM, to keep some air flowing to the cabin.

In FIG. 2, the vibration detection or monitor apparatus 25, i.e. the detector, is mounted on the housing 14, as for example at a location near the fan rotor 10, to detect vibration associated with rotor tip interference and or excessive bearing wear, as described. When a predetermined vibration threshold is detected, a signal is produced by 25, and transmitted at 26 to the motor, or to an electrical power switch associated with motor operation, to cause motor shut-down, stopping fan rotation, or reducing fan RPM, typically before an excessive vibration level is reached that would cause smoke formation. Such shut-down can be detected, as at 27, and a signal produced at 27a indicating that repair or replacement of the fan bearing is needed.

Figure 3A:
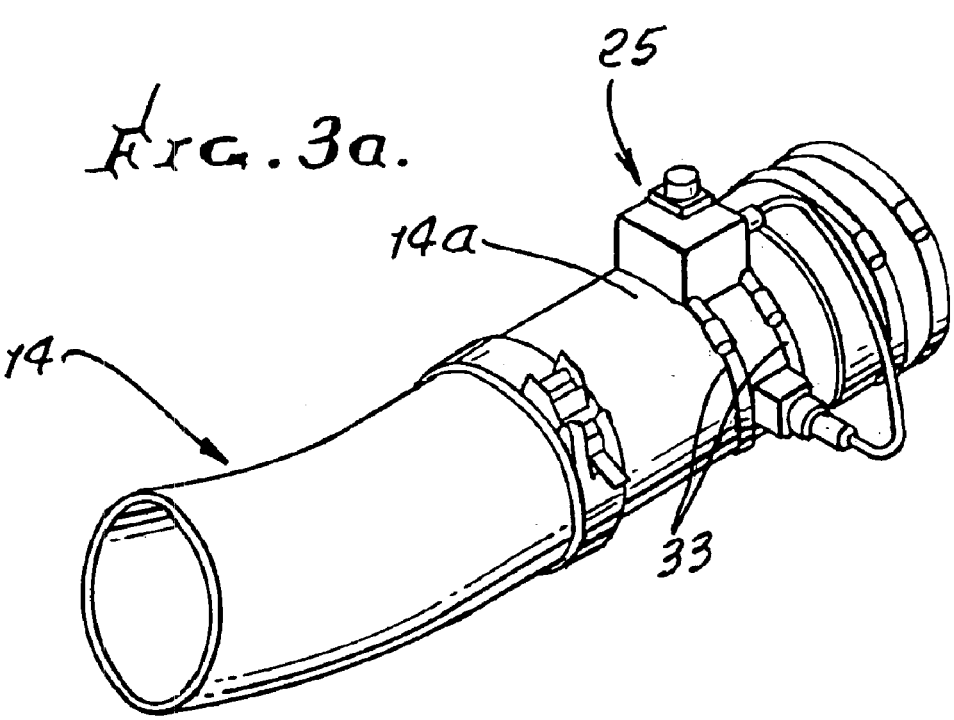
FIG. 3a is a perspective schematic view of a vibration monitor attached to a fan housing.
Figure 3B:
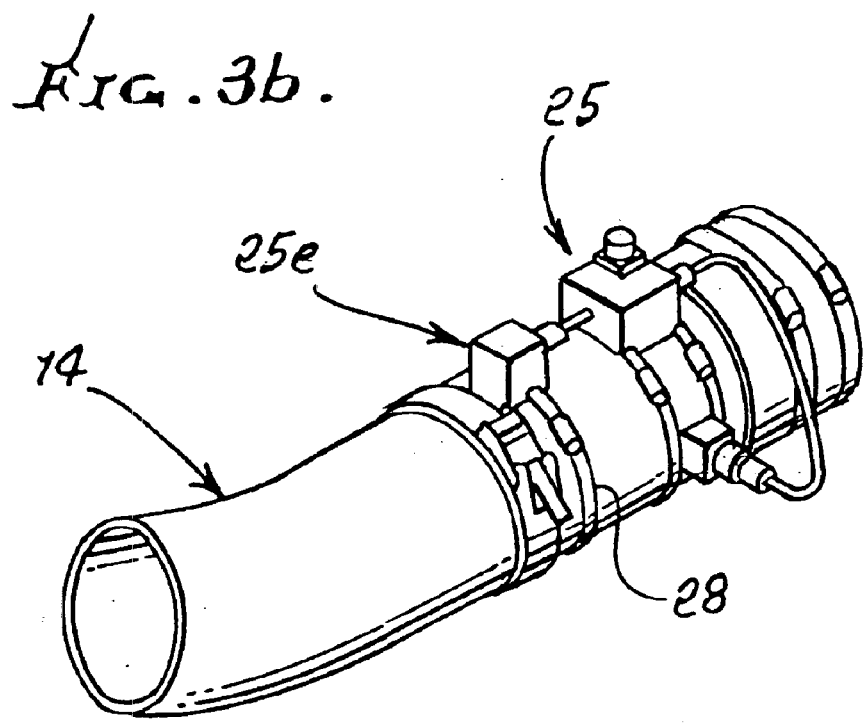
FIG. 3b is like FIG. 3a, but shows separate mounting of an accelerometer on the housing.

FIG. 3a shows a detector or monitor unit 25 attached to the outer side 14a of the housing or duct 14 that delivers fan induced air flow to the cabin. Attachment straps 33 are provided, and wrapped about the duct 14. FIG. 7 shows unit 25 as including controller 25b receiving a signal at 26 from an accelerometer. The controller operates as via 47 and relay 48 to cut-off power to the motor when detected vibrating reaches predetermined level. FIG. 3b shows an accelerometer 25e strap connected at 28 to duct 14, and sensing vibration, to produce signal 26. Connectors 29a and 29b are provided for connection between connectors 30a and 30b normally used for aircraft fan circuitry. See FIG. 7.

FIG. 4 shows a housing assembly 25c for enclosing the controller and/or the accelerometer. Strap brackets 39 are located on wall 40 of the assembly, to pass straps 33. An electrical cable 36 extends from the assembly 25c and carries an end terminal plug 25d. See FIG. 5. An elongated spiral support 34 connected to the housing at rod 34a receives and protects the cable 36 against sharp bending. Support 34 may consist of molded plastic material, and can resiliently flex or bend, to limited extent. Plug 25d is attachable to a mating plug at the motor.

The assembly 25c housing contains P.C. board 25b carrying a power supply 46, filters converters 47, and a latching device 48, LED or status indicators 49, and suitable electrical connectors. The accelerometer can be located in the same housing as the controller.

In FIG. 7, terminals 2–4 supply power to fan, and P.C. board lines 53 and 51 connect to lines 2' and 3', as shown. Lines 5' and 6' are connected to terminals 5 and 6, which are in turn connected to the thermal ON-OFF switch on the fan, the latch or relay 48 on the PC board being in series with line 5', whereby either excess bearing vibration, or overheating at the fan, result in shut-down of the fan.

I claim:

1. The method of remediating ventilation fan source production of smoke in an aircraft cabin, the fan having an air discharge into the cabin, that includes,
    a) detecting excessive vibration of the fan housing or frame produced prior to or in conjunction with fan rotor interference with the frame or housing causing smoke production, the fan having a rotating impeller with a bearing and rotating blade tip structure engageable with the housing or frame in response to bearing deterioration,
    b) and effecting shut-down or slowing of fan rotor rotation in response to such detecting,
    c) and including providing a vibration detector apparatus, positioning said detector apparatus on said housing or frame near the fan, and operating said detector apparatus to provide said detecting, thereby producing a signal effecting said shut-down or slowing.

2. The method of claim 1 wherein said interference is produced by rotor blade tip engagement with the housing or frame, leading to melting of plastic material associated with the housing or frame.

3. The method of claim 1 wherein the vibration level to be detected by said detector apparatus is predetermined so as to effect fan shut-down or slowing prior to significant smoke formation resulting from rotor blade tip engagement with the housing or frame, leading to melting of plastic material associated with the housing or frame.

4. The method of claim 1 wherein said positioning of said apparatus includes attaching said apparatus to the fan housing or frame.

5. The method of remediating ventilation fan source production of smoke in a vehicle cabin or passenger compartment that includes
    a) detecting excessive vibration of the fan housing or frame produced in conjunction with fan rotor interference with the frame or housing at a level causing smoke production,
    b) and effecting shut-down or slowing of fan rotor rotation in response to such detecting.

6. The method of claim 5 including providing a vibration detector apparatus, positioning and operating said detector apparatus to provide said detecting, thereby producing a signal effecting said shut-down or slowing.

7. The method of claim 6 including providing and operating a latch in the form of a relay at said detector apparatus to effect said shut-down.

8. Equipment for remediating fan source production of smoke in an aircraft cabin, comprising in combination:
    a) first means for detecting excessive vibration of the fan housing or frame produced in conjunction with fan rotor interference with the frame or housing causing smoke production, the fan having an air discharge into the cabin,
    b) and second means for effecting shut-down or slowing of fan rotor rotation in response to such detecting,
    c) said first means including vibration detector apparatus positioned on said housing or frame and operating to provide said detecting, thereby producing a signal effecting said shut-down or slowing.

9. The combination of claim 8 wherein the fan has a rotating impeller with a bearing and rotating blade tip structure engageable with the housing or frame in response to bearing deterioration.

10. Equipment for remediating fan source production of smoke in a vehicle cabin or passenger compartment, comprising in combination
    a) first means for detecting excessive vibration of the fan housing or frame produced in conjunction with fan rotor interference with the frame or housing causing smoke production the fan having an air discharge into the cabin
    b) and second means for effecting shut-down or slowing of fan rotor rotation in response to such detecting,
    c) said first means including vibration detector apparatus positioned on said housing or frame and operating to provide said detecting, thereby producing a signal effecting said shut-down or slowing,
    d) said detector apparatus having external connection to the frame or housing.

* * * * *